US012617560B2

(12) United States Patent
Morser et al.

(10) Patent No.: US 12,617,560 B2
(45) Date of Patent: May 5, 2026

(54) UNMANNED AERIAL VEHICLE TETHERED WITH OPTICAL FIBER

(71) Applicant: EQUINOX INNOVATIVE SYSTEMS, Inc., Columbia, MD (US)

(72) Inventors: Randal Morser, Columbia, MD (US); Cordell Reid, Baltimore, MD (US); Alexander Mazzotta, Dunkirk, MD (US)

(73) Assignee: EQUINOX INNOVATIVE SYSTEMS Inc., Columbia, MD (US)

( * ) Notice: Subject to any disclaimer, the term of this patent is extended or adjusted under 35 U.S.C. 154(b) by 0 days.

(21) Appl. No.: 18/140,131

(22) Filed: Apr. 27, 2023

(65) Prior Publication Data

US 2023/0348119 A1      Nov. 2, 2023

Related U.S. Application Data

(60) Provisional application No. 63/335,573, filed on Apr. 27, 2022.

(51) Int. Cl.
*B64U 10/60* (2023.01)
*B64U 20/87* (2023.01)

(52) U.S. Cl.
CPC ............. *B64U 10/60* (2023.01); *B64U 20/87* (2023.01)

(58) Field of Classification Search
CPC .. B64U 10/60; B64U 20/87; B64U 2201/202; B64C 39/022
See application file for complete search history.

(56) References Cited

U.S. PATENT DOCUMENTS

| | | | | |
|---|---|---|---|---|
| 3,241,145 | A * | 3/1966 | Petrides | H01P 5/08 343/705 |
| 5,448,410 | A * | 9/1995 | Freedenberg | B23K 26/0665 359/683 |
| 6,259,517 | B1 * | 7/2001 | Tedesco | G01M 11/3118 356/73.1 |
| 6,961,171 | B2 * | 11/2005 | Byren | F41H 13/005 359/333 |
| 7,149,611 | B2 * | 12/2006 | Beck | B64U 30/26 701/32.4 |
| 9,090,315 | B1 * | 7/2015 | Stone | E21B 41/0085 |
| 9,280,038 | B1 * | 3/2016 | Pan | A45F 5/10 |
| 9,290,269 | B2 * | 3/2016 | Walker | H02G 11/02 |
| 9,800,091 | B2 * | 10/2017 | Nugent, Jr. | H02J 50/402 |
| 9,920,706 | B1 * | 3/2018 | Yavid | B64U 50/35 |
| 10,090,929 | B2 * | 10/2018 | Morser | H04B 10/2575 |
| 10,168,695 | B2 * | 1/2019 | Barnickel | G05D 1/0011 |

(Continued)

*Primary Examiner* — Joshua J Michener
*Assistant Examiner* — Michael B. Kreiner
(74) *Attorney, Agent, or Firm* — Kim and Lahey Law Firm, LLC; Douglas W. Kim

(57) ABSTRACT

The unmanned aerial vehicle (UAV) tethered with an optical fiber is an unmanned aerial vehicle, drone or the like carrying an optical device which is tethered to an external light source. The light source may be a ground-based laser. The optical device is connected to, and optically coupled with, the light source by a tether including at least one optical fiber. A stabilizer may be mounted on the optical device for stabilizing orientation and direction thereof. The optical device may include at least one collimator and at least one focusing lens for shaping and focusing the received light for output to a selected target.

11 Claims, 2 Drawing Sheets

(56)    References Cited

U.S. PATENT DOCUMENTS

| 11,174,021 | B2 * | 11/2021 | Anderson | B60L 58/12 |
|---|---|---|---|---|
| 11,661,186 | B2 * | 5/2023 | Piasecki | B64U 30/24 |
| | | | | 701/3 |
| 11,691,761 | B2 * | 7/2023 | Dolata | B60L 53/16 |
| | | | | 244/17.23 |
| 11,786,991 | B2 * | 10/2023 | Kurosawa | G05D 1/101 |
| | | | | 219/121.78 |
| 11,977,395 | B2 * | 5/2024 | Anderson | B64U 70/95 |
| 2023/0191462 | A1 * | 6/2023 | Clowes | B63G 8/001 |
| | | | | 134/1 |

* cited by examiner

UNMANNED AERIAL VEHICLE TETHERED WITH OPTICAL FIBER

CROSS-REFERENCE TO RELATED APPLICATIONS

This application claims the benefit of U.S. Provisional Patent Application No. 63/335,573, filed on Apr. 27, 2022.

BACKGROUND OF THE INVENTION

Field of The Invention

The disclosure of the present patent application relates to unmanned aerial vehicles, and particularly to an unmanned aerial vehicle carrying an optical device which is tethered to an external light source.

Description of Related Art

Laser systems and other systems which generate directed light are used for a wide variety of different applications. Examples of such applications include energy-based weapon systems, welding or heating applications, distance measurement, chemical analytics, particle analytics, object targeting and disruption of target optical systems. Conventionally, such systems are standalone devices or integrated into stationary devices. As such, such systems are limited in their usage because they must be used either at their permanent installation sites, or they must be painstakingly disassembled, moved and then reassembled.

Although portable laser systems are known, such systems typically have very low power outputs and are conventionally used for little more than recreational purposes. There is a need for making higher power laser systems more portable and usable over a wider field of applications. Thus, an unmanned aerial vehicle tethered with an optical fiber solving the aforementioned problems is desired.

SUMMARY OF THE INVENTION

The unmanned aerial vehicle (UAV) tethered with an optical fiber is an unmanned aerial vehicle, drone or the like carrying an optical device which is tethered to an external light source. As a non-limiting example, the light source may be a ground-based laser. The optical device is connected to, and optically coupled with, the light source by a tether including at least one optical fiber. A stabilizer may be mounted on the optical device for stabilizing orientation and direction thereof. It should be understood that the optical device may be any suitable type of optical device for receiving and utilizing the light generated by the light source. As a non-limiting example, the optical device may include at least one collimator and at least one focusing lens for shaping and focusing the received light for output to a selected target.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
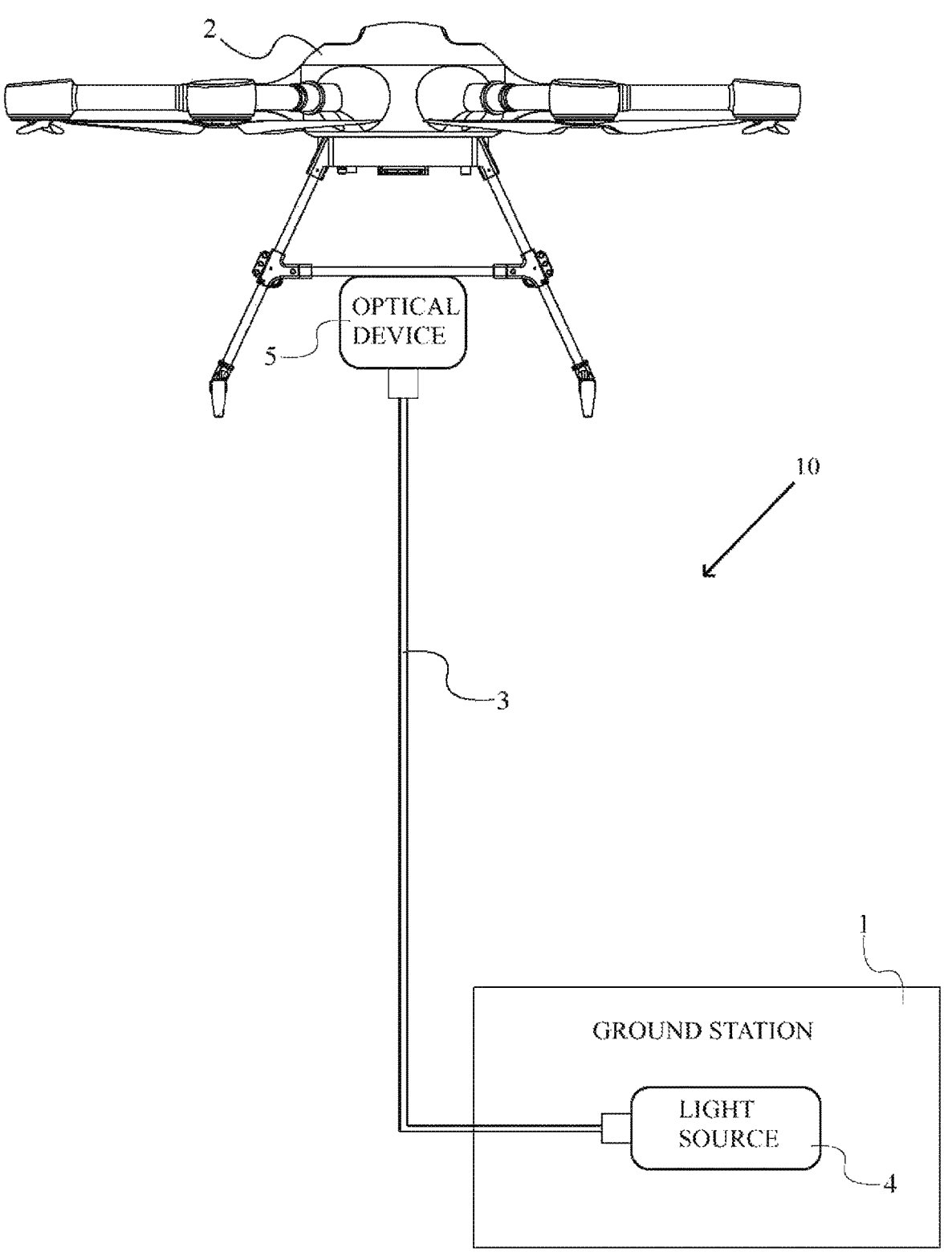
FIG. 1 diagrammatically illustrates an unmanned aerial vehicle tethered with an optical fiber.

The unmanned aerial vehicle (UAV) tethered with an optical fiber 10 is an unmanned aerial vehicle 2, drone or the like carrying an optical device 5 which is tethered to at least one light source 4. As a non-limiting example, the at least one light source 4 may be a ground-based laser. The optical device 5 is connected to, and optically coupled with, the at least one light source 4 by a tether 3 including at least one optical fiber.

Figure 2:
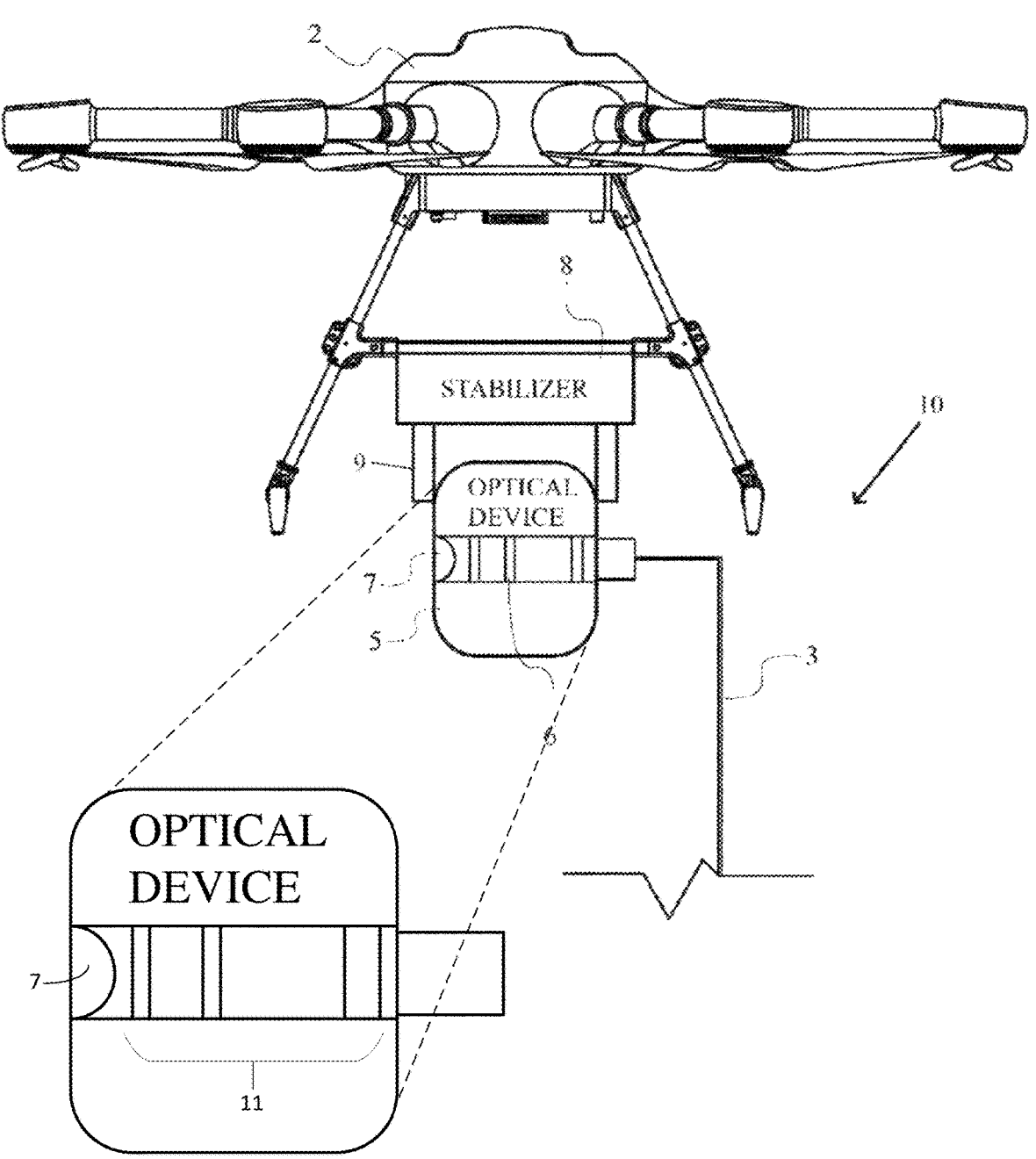
FIG. 2 partially diagrammatically illustrates the unmanned aerial vehicle tethered with an optical fiber.

It should be understood that the multi-rotor drone 2 shown in FIGS. 1 and 2 is shown for exemplary purposes only and that any suitable type of unmanned aerial vehicle may be used. It should be further understood that the optical device 5 may be any suitable type of optical device for receiving and utilizing the light generated by the at least one light source 4. Non-limiting examples of such optical devices include energy-based weapon systems, welding or heating devices, distance measurement systems, chemical analyzers, particle analyzers, object targeting systems, and countermeasure systems for disrupting optical targeting systems.

It should be further understood that tether 3 may be any suitable type of tether for tethering the unmanned aerial vehicle 2 and may have one or more optical fibers integrated therein using any suitable manufacturing method. Alternatively, tether 3 may be constructed from one more optical fibers. It should be understood that tether 3 may include any desired number of optical fibers, dependent upon the particular number of optical channels used by optical device 5. It should be further understood that any required optical couplers or other optical components required for coupling the optical fiber(s) to the at least one light source 4 and the optical device 5 may be used. Further, it should be understood that any suitable type of optical fiber(s) or other types of waveguide(s) may be used, such as, but not limited to, single mode or multimode optical fibers. It should also be understood that the number of optical fiber(s) may be selected based upon the number of light source(s) 4 used, such that each light source has a unique optical fiber connecting it to the optical device 5.

In the non-limiting example of FIG. 2, the optical device 5 is shown as including at least one collimator 6 and at least one focusing lens 7 for shaping, directing and focusing the received light for output to a selected target. As noted above, optical device 5 may require multiple optical channels, thus, as a non-limiting example, multiple optical fibers may be included in tether 3 for coupling to respective multiple sets of collimators 6 and focusing lenses 7.

In the non-limiting example of FIG. 1, the at least one light source 4 is shown as being contained within a ground station 1. It should be understood that the at least one light source 4 may be mounted on, or contained within, any suitable type of structure, such as a building, a vehicle, a trailer or the like. Alternatively, the at least one light source 4 may be a standalone unit, may be a portable unit, or may be integrated into a larger device or system. It should be further understood that the at least one light source 4 may be any suitable type of source of directed light or other electromagnetic radiation. Non-limiting examples of the at least one light source 4 include lasers, pulsed wave fiber lasers, and continuous wave fiber lasers. The at least one light source 4 may be powered by any suitable source of energy, and may further have a controllable output power, dependent upon the particular needs and usage of the optical device 5.

As shown in FIG. 2, a stabilizer 8 may be mounted on the optical device 5 for stabilizing orientation and direction thereof. It should be understood that any suitable type of stabilizer may be used. As a non-limiting example, stabilizer 8 may be a gimbal mechanism for orienting and stabilizing optical device 5 about one or more axes. It should be understood that the stabilizer 8 may be mounted on optical device 5 using any suitable type of attachment or coupler. In the non-limiting example of FIG. 2, stabilizer device 8 is shown as being directly coupled to the unmanned aerial vehicle 2, and the optical device 5 is mounted to the stabilizer device 8 by a clamp 9. It should be understood that clamp 9 is shown for exemplary purposes only. It should be further understood that stabilizer device 8 may include the necessary hardware for orienting and directing the optical device 5 using any suitable type of programming and/or through remote control. Alternatively, stabilizer device 8 may be manually adjustable.

As noted above, optical device 5 may be any suitable type of optical device for receiving and outputting light generated by the at least one light source 4. Thus, it should be understood that optical device 5 may include any necessary optical, mechanical and/or electrical components dependent on the particular application of optical device 5. As a non-limiting example, optical device 5 may include an optical adjustment mechanism for adjusting the intensity of the output light and/or for focusing the at least one lens 7. As a further non-limiting example, the optical adjustment mechanism may include one or more additional adjustment-specific lenses 11 to be used in conjunction with the at least one lens 7. It should be understood that any suitable type of lenses may be used, including, but not limited to, barlow lenses and telecompressor lenses. It should be further understood that the optical adjustment mechanism of optical device 5 may include the necessary hardware for adjusting the intensity, focus, direction, etc. of the output light using any suitable type of programming and/or through remote control. The optical adjustment mechanism, as a non-limiting example, may include, or be in communication with, a microcontroller which, in turn, may be in communication with a flight controller or a single board computer (SBC) associated with the unmanned aerial vehicle 2.

It is to be understood that the unmanned aerial vehicle tethered with an optical fiber is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An unmanned aerial vehicle tethered with an optical fiber comprising:

an unmanned aerial vehicle;

an optical device mounted on the unmanned aerial vehicle;

at least one light source;

a collimator carried by the unmanned aerial vehicle and cooperatively associated with a focusing lens for shaping, directing and focusing the received light for output to a selected target; and a tether connecting and optically coupling the optical device and the at least one light source, the tether comprising at least one optical fiber;

an optical adjustment mechanism in electronic communication with a microcontroller, wherein the microcontroller is in electronic communication with a flight controller or single board computer associated with the unmanned aerial vehicle, the optical adjustment mechanism comprising one or more adjustment-specific lenses used in conjunction with the focusing lens; amd, a stabilizer device directly coupled to the unmanned aerial vehicle, wherein the optical device is mounted to the stabilizer device by a clamp, and wherein the stabilizer device comprises a gimbal mechanism for orienting and stabilizing the optical device about one or more axes.

2. The unmanned aerial vehicle tethered with an optical fiber as recited in claim 1, wherein the light source is ground-based.

3. The unmanned aerial vehicle tethered with an optical fiber as recited in claim 1, wherein the light source comprises a laser.

4. The unmanned aerial vehicle tethered with an optical fiber as recited in claim 1, further comprising a stabilizer mounted on the optical device for stabilizing orientation and direction thereof.

5. The unmanned aerial vehicle tethered with an optical fiber as recited in claim 1, wherein the unmanned aerial vehicle comprises a multi-rotor drone.

6. The unmanned aerial vehicle tethered with an optical fiber as recited in claim 1, wherein the tether comprises a plurality of optical fibers.

7. The unmanned aerial vehicle wherein each of the plurality of optical fibers is optically coupled to one of a set of collimators and focusing lens.

8. An unmanned aerial vehicle tethered with an optical fiber comprising:

an unmanned aerial vehicle having an optical device mounted on the unmanned aerial vehicle;

a focusing lens for shaping, directing and focusing the received light into a focused output directed to a selected target, an optical adjustment mechanism adapted to adjust the intensity, focus, direction and any combination thereof of the focused output onto the selected target, comprising a plurality of adjustment-specific lenses selected from barlow lenses and telecompressor lenses, wherein the adjustment-specific lenses are used in conjunction with the focusing lens, and, a tether connecting and optically coupling the optical device to a ground based light source.

9. The unmanned aerial vehicle of claim 8 including a stabilizer carried by the unmanned aerial vehicle and attached to the optical device for stabilizing the orientation and direction of the optical device.

10. An unmanned aerial vehicle comprising:

an unmanned aerial vehicle;

an optical device mounted on the unmanned aerial vehicle;

a collimator and at least one focusing lens for shaping and focusing the received light to provide an output focused on a selected target;

a tether connecting and optically coupling the optical device and a ground based light source; and, a stabilizer device directly coupled to the unmanned aerial vehicle, wherein the optical device is mounted to the stabilizer device by a clamp, wherein the stabilizer device comprises a gimbal mechanism for orienting and stabilizing the optical device about one or more axes, and wherein the stabilizer device includes hardware for orienting and directing the optical device through remote control.

11. The unmanned aerial vehicle of claim 10 including an optical adjustment mechanism in communication with the optical device adapted to adjust the intensity, focus, direction and any combination thereof of the output onto a selected target.

* * * * *